United States Patent [19]

Patton

[11] 4,294,785

[45] Oct. 13, 1981

[54] PROCESS OF CASTING POLYPARABANIC ACID FILMS FROM STABILIZED ORGANIC AMIDE SOLVENTS

[75] Inventor: Tad L. Patton, Baytown, Tex.

[73] Assignee: Exxon Research & Engineering Co., Florham Park, N.J.

[21] Appl. No.: 102,678

[22] Filed: Dec. 12, 1979

Related U.S. Application Data

[62] Division of Ser. No. 967,660, Dec. 8, 1978, Pat. No. 4,208,486, which is a division of Ser. No. 797,842, May 17, 1977, Pat. No. 4,144,213.

[51] Int. Cl.$^3$ .......................... B29D 27/00; B32B 3/14
[52] U.S. Cl. ........................................ 264/41; 521/61;
521/64; 521/179; 260/30.2; 260/30.6 R;
260/32.6 NT; 260/32.6 NR; 260/32.6 NA;
260/45.7 S; 260/45.9 E; 260/45.85 H;
260/45.85 R; 260/45.95 C; 260/45.95 G;
260/45.85 A; 260/45.85 H

[58] Field of Search ......................... 264/41, 216, 331;
521/61, 64, 179

[56] References Cited

U.S. PATENT DOCUMENTS 4,201,820  5/1980  Johnson ............................ 428/195

FOREIGN PATENT DOCUMENTS 700565  12/1953  United Kingdom .
934513   8/1963  United Kingdom .
1255028 11/1971  United Kingdom .

*Primary Examiner*—John C. Bleutge
*Assistant Examiner*—Herbert J. Lilling
*Attorney, Agent, or Firm*—M. B. Kurtzman

[57] ABSTRACT

Organic amides, solutions of polymers thereof, which polymers are subject to hydrolysis and degradation in the presence of amines, and polymers isolated therefrom are stabilized by the presence of aromatic sulfonic acid esters of aliphatic, arylaliphatic and alicyclic alcohols and polyols.

8 Claims, No Drawings

PROCESS OF CASTING POLYPARABANIC ACID FILMS FROM STABILIZED ORGANIC AMIDE SOLVENTS

This is a division of application Ser. No. 967,660, filed Dec. 8, 1978, now U.S. Pat. No. 4,208,486 which is a Rule 60 division of Ser. No. 797,842, filed May 17, 1977 now U.S. Pat. No. 4,144,213.

BACKGROUND OF THE INVENTION

Organic amides, e.g., dimethylformamide (DMF), are widely used as solvents for the preparation of polymer solutions, such as poly(iminoimidazolidinediones), polyparabanic acids, polyamides, polyimides, polyurethanes, polyhydantoins and the like.

In U.S. Pat. No. 3,758,577 granted Sept. 11, 1973, to Dinbergs, the vagaries of DMF, including residual dimethylamine, were believed to result in degradation of polymer solutions in DMF. Dinbergs discovered DMF and polymer solutions thereof were stabilized with halogen-containing compounds of the structure

wherein R is a saturated aliphatic hydrocarbon chain containing one to six carbon atoms, or an aliphatic hydrocarbon chain containing two to six carbon atoms and having a terminal double bond; $R_1$, $R_2$ and $R_3$ are hydrogen or an alkyl group containing from one to four carbon atoms; and X is a halogen selected from the group consisting of chlorine, bromine and iodine.

It has now been discovered that the problem as perceived by Dinbergs was not fully characterized or appreciated. Dimethylamine has been determined to cause rapid polymer degradation, however, it is believed that not only residual dimethylamine, but also dimethylamine which is liberated by the slow hydrolysis of DMF by small quantities of water, contribute to the polymer degradation. Moreover, organic amides, in general, hydrolyze in the presence of water to liberate amines. Therefore, polymers dissolved in organic amides undergo the same type of degradation observed in DMF polymer solutions.

By way of example, polymers which are sensitive to amines include polyparabanic acids, poly(iminoimidazolidinediones) polyurethanes, polyureas, polyesters, polyamides, polyimides, polycarbonates and polymers which contain one or more of the groups characteristic of these polymers.

Organic amide solvents, e.g., DMF, are not only extremely difficult to dry, but absorb water when exposed to a humid atmosphere. It has been found that, depending on the method of preparing polymer solutions and the precautions taken to exclude moisture, the water concentrations may be high, e.g., 8 to 10% by weight.

Other methods which have been employed in the prior art to stabilize DMF include contacting the solvent with ion-exchange resins and molecular sieves prior to use.

The hydrolytic instability of DMF and other amide solvents and the resultant degradative effect of their hydrolysis products is manifested by molecular weight degradation of the dissolved polymer. Fibers and films made from solutions in which the polymer has undergone degradation are inferior to products which would be expected from the virgin polymer.

The instability of polymer solutions dissolved in organic amide solvents can be readily determined from the decline in viscosity of the polymer solution. Similarly, residual organic amide solvent in product polymer films, fibers, casting and the like can also cause polymer degradation during aging apparently by the same mechanism.

Thus, it is a feature of the present invention that a novel class of stabilizers has been found which, when dissolved in organic amide solvents, having in solution therein polymers which are subject to amine degradation, will inhibit degradation of the polymers dissolved therein. An additional advantage of the present stabilizers is the stabilization of polymer products produced from the stabilized solutions. These and other advantages and features of the present invention will be seen in the following descriptions.

SUMMARY OF THE INVENTION

The invention has several aspects. One aspect of the invention is stabilized solutions of polymers in organic amide solvents containing dissolved therein aromatic sulfonic acid esters of aliphatic, arylaliphatic and alicyclic alcohols and polyols, said polymers being subject to degradation in the presence of amines.

The invention also includes the method of stabilizing solutions of the defined polymers in organic amide solvents by adding soluble esters of aromatic sulfonic acid esters of aliphatic, arylaliphatic and alicyclic alcohols and polyols.

It has been found that trace amounts of residual organic amide solvents which are not removed from the polymers isolated from solutions of such solvents cause instability of the polymers, especially at elevated temperatures and in humid atmospheres. The present invention also includes stabilized polymers containing residual amounts of organic amide solvents and aromatic sulfonic acid esters of aliphatic, arylaliphatic and alicyclic alcohols and polyols.

In the normal fabrication of polymer films, fibers, coatings, etc. from solution in organic amide solvents, every effort is made to remove all of the solvent; however, as a practical matter, there will normally be some residium thereof in the polymer product. The same reactions which act to degrade the polymers in solution also may occur in such polymer products.

In yet another aspect of the present invention, organic amide solvents containing a stabilizing amount of aromatic sulfonic acid esters of aliphatic, arylaliphatic, and alicyclic alcohols and polyols are claimed.

DETAILED DESCRIPTION OF THE INVENTION

The organic amide solvents include organic amides which are liquid at the temperature of use, above 10° C., i.e., generally about 20° to about 275° C. Included are:
dimethylformamide
diethylformamide
N,N-dimethylacetamide
N,N-diethylacetamide
N,N-dimethylpropionamide
N,N-dimethylbutyramide
N-methylpyrrolidone
N-ethylpyrrolidone hexamethylphosphoramide.

The organic amide solvents normally contain amine impurities or degradation products such as from the hydrolysis of the amides by water impurity, e.g., as the hydrolysis of DMF to liberate dimethylamine. Thus, as noted above, even careful and rigorous purification of the amides prior to use and the use of extreme precautions to maintain them in an anhydrous state are rarely successful to prevent the adsorption of atmospheric moisture. In any event, by employing the present invention, the degradation of the polymers is substantially reduced.

The polymers which are stabilized against degradation are those which are subject to reaction with amines or likely to undergo hydrolysis in the presence of amines. The polymer degradation is a scission of the chains by reaction with amines or by hydrolysis catalyzed by amines which is observed by a decline in the viscosity of polymer solutions during aging and similarly by a decrease of the inherent viscosity of solid polymer isolated from the polymer solutions.

Polymers which are subject to chain scission in an amine environment include poly(iminoimidazolidinediones), polyparabanic acids, polyurethanes, polyesters, polyureas, polyamides, polyimides, polycarbonates, polyhydantoins and polymers containing one or more moieties characteristic of these polymers. Such polymers and their preparation are well known. For example, poly(iminoimidazolidinediones) and polyparabanic acids and their preparation are described in U.S. Pat. Nos. 3,661,859; 3,635,905; 3,547,897; and 3,591,562, to name a few, which are incorporated by reference herein.

For the preparation of fibers, films, coatings, etc., by casting, spinning and the like, solutions of these polymers are conventionally employed in amounts of from 1 to 50 weight percent polymer in the organic amide solvents, based on the total weight of the polymer solution.

The materials which have been found to provide stability as described herein are aromatic sulfonic acid esters of aliphatic, arylaliphatic, and alicyclic alcohols and polyols which are soluble in organic amide solvents. Such compounds and methods of their preparation are well known and amply described in the literature. In accordance with the present invention, it has been discovered that these compounds act as scavengers for amines present in such organic amide solvents, such polymer solutions thereof, and such polymers isolated therefrom. These aromatic sulfonic acid esters react with amines to form ammonium salts which do not react with nor degrade or otherwise adversely affect the organic amide solvent or polymer. Furthermore, the aromatic sulfonic acid esters (stabilizers) themselves do not adversely affect the organic amide solvents or polymers.

The aromatic sulfonic acid esters are entrained or otherwise contained in polymers isolated from organic amide solutions. Therefore, such isolated polymers are protected from amines which may arise from residual solvent hydrolysis.

Any aromatic sulfonic acid ester of aliphatic, arylaliphatic and alicyclic alcohols and polyols known in the art may be employed as the stabilizer in accordance with the present invention. Included are alkyl, alkylaryl, and alicyclic esters of aromatic sulfonic acids and polyaromatic sulfonic acids.

More particularly, aromatic sulfonic acid esters suitable for the present invention include compounds of the following structure:

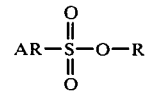

wherein AR is an aryl or alkylaryl group having six to eighteen carbon atoms and substituted analogs thereof wherein the substituents may be selected from alkoxy, halogen, alkoxy carbonyl, acyl, nitro, hydroxy, and carbonyl, such as phenyl, halo (F, Cl, Br, I) phenyl, alkoxy phenyl, biphenyl, naphthyl, alkyl substituted phenyl, such as tolyl, ethyl phenyl, diethyl phenyl and the like; and wherein R is an aliphatic, arylaliphatic or alicyclic group having from two to eighteen carbon atoms and substituted analogs thereof, such as methyl, ethyl, propyl, isopropyl, butyl, pentyl, hexyl, 2-methyl pentyl, heptyl, octyl, cyclopentyl, cyclohexyl, methyl cyclopentyl, ethyl cyclohexyl, and the like and wherein substituents may be selected from alkoxy, halogen, alkoxy carbonyl, acyl, nitro, hydroxy, carbonyl and the like. Illustrative aromatic sulfonic acid esters of the above structure include methyl p-toluene sulfonate, ethyl p-toluene sulfonate, cyclohexyl o-toluene sulfonate, methyl bromobenzene sulfonate, isopropyl acetylbenzene sulfonate, cyclopentyl benzene sulfonate, ethyl chlorobenzene sulfonate, butyl 2,5-dichlorobenzene sulfonate, cyclohexyl naphthalene sulfonate, ethyl dimethylbenzene sulfonate, ethyl methyl naphthalene sulfonate, methyl naphthol sulfonate, cyclopentyl naphthoquinone sulfonate, octyl nitrobenzene sulfonate, isopropyl nitrotoluene sulfonate, methyl phenol sulfonate, dimethyl ester of 3-sulfobenzoic acid, trimethyl ester of 4-sulfophthalic acid, diethyl ester of 3-sulfo-2-hydroxybenzoic acid, decyl trichlorobenzene sulfonate, methyl benzene sulfonate, ethyl benzene sulfonate, butyl benzene sulfonate and the like.

Additionally, polyaromatic sulfonate esters suitable for the present invention include compounds of the following structures:

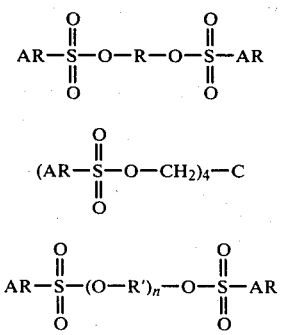

where each AR is the same as described above (each AR being independently selected therefrom); R is a divalent aliphatic, arylaliphatic, or alicyclic group such as ethylene, trimethylene, tetramethylene, xylylene, and cyclohexylene; and R' is a divalent aliphatic group having two to four carbon atoms; and n is an integer from two to 100, preferably 2-10.

Illustrative of these polyaromatic sulfonate esters are ethylene bis (benzene sulfonate), ethylene bis (p-toluenesulfonate), trimethylene bis (p-toluenesulfonate), tetramethylene bis (p-toluenesulfonate), ethylene (p-toluenesulfonate, benzene sulfonate), xylylene bis (p-toluenesulfonate), cyclohexylene bis (p-toluenesulfonate), ethylene bis (naphthalene sulfonate), and the like.

The above-described stabilizers react mole per mole, stoichiometrically, with amines. However, the quantity of stabilizer required to effectively stabilize a given organic amide solvent or polymer solution may vary widely, depending upon several factors, such as initial amine concentration in the solvent, water concentration in solvent or polymer solution, polymer concentration, temperature, processing conditions, storage time, etc. Therefore, the stabilizer is employed in accordance with the invention in a sufficient amount to stabilize the particular solvent or polymer solution or polymer isolated therefrom, i.e., to prevent amine degradation of polymer present or dissolved in said solvent.

Since the hydrolysis of the solvent may be viewed as a continuing response to absorbed atmospheric water, the amount of stabilizer employed is generally an excess beyond the stoichiometric amount of amines present in the solvent. The amount of stabilizer in the solvent must also be viewed in regard to the use of the solvent, i.e., the dissolution of the above-described polymers therein. In practice, the concentration of stabilizer in solution (either the organic amide solvent alone or polymer solution thereof) usually ranges from about 0.01 to about 10% by weight.

Furthermore, in practice, the organic amide solvent is preferably stabilized with the above-described aromatic sulfonic acid esters prior to the solution of a polymer therein, because the amines are generally present in the solvent to varying degrees at all times for reasons noted herein. The attack of these amine impurities on the susceptible polymer linkages is rather rapid and may begin immediately upon contact of the polymer with the solvent. The degradation is enhanced at higher solution temperatures. Hence, the present invention also contemplates stabilized organic amide solvents consisting of the liquid organic amide and a stabilizing amount of the above-described aromatic sulfonic acid esters.

Accordingly, the term "stabilizing" as it is used herein is understood to mean that amount of aromatic sulfonic acid esters of aliphatic, arylaliphatic and alicyclic alcohols and polyols which will react with amine materials present in an organic amide solvent, a polymer solution thereof and isolated polymers therefrom.

In general, the preferred polymers of the invention are those having sufficient repeating units characteristic of the polymer, as referred to above, to result in solids at room temperatures when such polymers are isolated from organic amide solvent solutions.

In addition to the stabilizers of the present invention, it is contemplated that other additives such as those employed to stabilize against oxidation or ultraviolet light, plasticizers, flame retardants, pigments, fillers and the like may be present.

The following examples illustrate the invention and should not be construed to limit the present invention in any way. In the examples, unless otherwise noted, a particular polymer, i.e., a polyparabanic acid, is employed. However, it is to be understood that other polymers described hereinabove may be employed with substantially similar results being obtained.

Except as specifically noted, the polyparabanic acid employed in the following examples was prepared from diphenylmethane diisocyanate in accordance with techniques well described in the patent literature, e.g., in the above U.S. Patents incorporated by reference herein, all assigned to Exxon Research and Engineering Company, to result in a polymer having the repeating unit shown below:

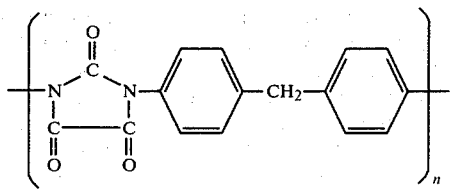

which is also designated as poly [1,4-phenylenemethylene-1,4-phenylene-1,3-(imidazolidine-2,4,5-trione)] which are also designated in chemical abstracts as poly [(2,4,5-trioxo-1,3-imidazolidinediyl)-1,4-phenyl methylene-1,4-phenylene]. It will be recognized, however, that other polyparabanic acids produced from other precursors, e.g., such as described in several of the above-referenced commonly assigned U.S. patents, may be stabilized in the same manner as exemplified.

EXAMPLE 1

This example shows that the rate at which the inherent viscosity of a polyparabanic acid (PPA) in dimethylformamide (DMF) decreases is related to the concentration of water in the solution, the temperature at which the solution is stored, and by the presence of methyl toluenesulfonate. Molecular weight degradation of the polymer probably occurs by attack of dimethylamine which is liberated by the slow hydrolysis of the solvent.

The solutions were prepared by dissolving 10 g portions of PPA in 90 gram quantities of solvent which was either dimethylformamide or various mixtures of dimethylformamide and water. Some of the solutions also contained 0.01 g of methyl p-toluenesulfonate.* The solutions were aged at room temperature (27°–24° C.) and at 50° C. After various intervals of time, samples were withdrawn and mixed with water to precipitate the polymer. The inherent viscosity of each polymer was determined in DMF (c=0.5 g/100 ml) at 25° C.
*metosylate

TABLE I

Solutions aged at Room Temperature

| Water wt. % | Additive | Inherent Viscosities | | |
|---|---|---|---|---|
| | | t = o | t = 336 hrs. | t = 1008 hrs. |
| 0 | none | 1.13 | 1.06 | 1.01 |
| 0 | metosylate | 1.14 | 1.12 | 1.09 |
| 0.2 | none | 1.09 | 1.07 | 1.01 |
| 0.4 | none | 1.09 | 1.05 | 0.97 |
| 0.8 | none | 1.12 | 1.02 | 0.92 |
| 0.8 | metosylate | 1.12 | 1.09 | 1.05 |
| 1.6 | none | 1.10 | 0.98 | 0.85 |
| 3.2 | none | 1.08 | 0.93 | 0.76 |

Solutions aged at 50° C.

| | | t = 5 hrs. | t = 168 hrs. | t = 336 hrs. |
|---|---|---|---|---|
| 0 | none | 1.12 | 0.92 | 0.80 |
| 0 | metosylate | 1.13 | 1.06 | 0.96 |
| 0.2 | none | 1.09 | 0.76 | 0.60 |
| 0.4 | none | 1.08 | 0.67 | 0.50 |
| 0.8 | none | 1.07 | 0.68 | 0.51 |
| 0.8 | metosylate | 1.10 | 0.87 | 0.64 |
| 1.6 | none | 1.02 | 0.48 | 0.32 |
| 3.2 | none | 1.02 | 0.35 | 0.21 |

EXAMPLE 2

This example shows that the rate of degradation of a PPA in a solution of 96 parts dimethylformamide and 4 parts water is essentially independent of the concentration of polymer in the solution.

Weighed quantities of PPA were dissolved in 180 g. portions of a solution which was prepared from 96 parts of DMF and 4 parts water. The solutions were then aged 138 hours at 50° C. The inherent viscosities of the polymers precipitated from the aged solutions (t=18 and 138 hrs.) were then compared with each other and with their original values (t=0). The results (below TABLE II) show that the degradation was independent of the polymer concentration.

TABLE II

| Polymer Conc., wt. % | ηinh (t = 0) | ηinh (t = 18 hrs.) | ηinh (t = 138 hr) |
|---|---|---|---|
| 5.0 | 0.87 | 0.70 | 0.35 |
| 10.0 | 0.90 | 0.71 | 0.35 |
| 15.0 | 0.89 | 0.69 | 0.35 |

EXAMPLE 3

This example demonstrates the effectiveness of methyl p-toluenesulfonate as a stabilizer for PPA dissolved in a dimethylformamide-water mixture. The following solutions were prepared and maintained at 75° C. During the succeeding 23 hours the pH (at 25° C.) of each solution was monitored. After 5 hours, a portion of each solution was mixed with water to precipitate the polymer. The inherent viscosity (c=0.5 g. per 100 ml. DMF at 25° C.), of each polymer was determined. The results are recorded in TABLE III.

TABLE III

|  | A | B | C |
|---|---|---|---|
| PPA, g | 6.0 | 6.0 | 6.0 |
| DMF, g | 63.4 | 65.25 | 64.3 |
| Water, g | 3.75 | 3.75 | 3.75 |
| Metosylate, g | 1.86 | none | none |
| $H_2SO_4$ | none | none | 0.98 |
| pH at t = 0 | 3.53 | 7.04 | 1.45 |
| pH at t = 5 hrs. | 3.50 | 5.49 | 5.00 |
| ηinh, t = 0 | 1.0 | 1.0 | 1.0 |
| ηinh, t = 5 hrs. | 0.97 | 0.62 | 0.58 |

The results show that after 5 hours at 75° C.: (1) the pH of the solution which contained methyl p-toluenesulfonate was essentially unchanged while that of the other two solutions had changed significantly and (2) the inherent viscosity of the polymer in the solution which contained methyl p-toluenesulfonate decreased very little while that of the polymers in the other two solutions decreased to about 60% of their original values. Although the weight of methyl p-toluenesulfonate in solution A was almost twice that of the sulfuric acid used in solution C, the moles (0.01) of each was the same. Furthermore, 0.01 mole of the sulfonate ester will react and neutralize only 0.01 mole of dimethylamine (liberated by the hydrolysis of DMF) while 0.01 mole of sulfuric acid should neutralize 0.02 mole of amine. Therefore, lowering the pH by addition of acid did not give the stability that the sulfonate ester gave.

EXAMPLE 4

In this example, the effects on water, temperature, and methyl p-toluenesulfonate on the stability of PPA in dimethylformamide (DMF) are demonstrated. Four solutions were prepared; their compositions are shown in TABLE IV below. Then half of each solution was aged at 40° C. and the other half was aged at 50° C. Periodically polymer from each solution was precipated in water and its inherent viscosity was determined.

The data (see TABLE IV below) shows the following: (1) The inherent viscosities of the polymers in solutions C and D which contained water decreased at a much faster rate than did those of polymers in the dry solutions A and B, respectively. (2) The rate of degradation of the polymer in solution at 50° C. is faster than at 40° C. This also implies that the polymer would be stabilized during film casting and drying at elevated temperatures during which the concentration of polymer in solution slowly increases. (3) The rate of polymer degradation was decreased significantly by the presence of methyl p-toluenesulfonate. (4) Even in the presence of added water, methyl p-toluenesulfonate decreased the rate of polymer degradation.

TABLE IV

|  | A | | B | | C | | D | |
|---|---|---|---|---|---|---|---|---|
| PPA, g. | 15 | | 15 | | 15 | | 15 | |
| DMF, g. | 135 | | 135 | | 128.2 | | 128.2 | |
| Water, g. | 0 | | 0 | | 6.75 | | 6.75 | |
| Metosylate[a], g. | 0 | | 0.60 | | 0 | | 0.60 | |
| Temp., °C. | 40 | 50 | 40 | 50 | 40 | 50 | 40 | 50 |
| ηinh[b], t = 0 | 0.97 | 0.97 | 1.17 | 1.17 | 0.97 | 0.97 | 0.97 | 0.97 |
| ηinh, t = 77 hrs. | 0.92 | 0.85 | 1.17 | 1.13 | 0.65 | 0.45 | 0.93 | 0.73 |
| ηinh, t = 97 ½hrs. | 0.91 | 0.84 | 1.17 | 1.13 | 0.63 | 0.41 | 0.93 | 0.66 |
| ηinh, t = 114 hrs. | 0.90 | 0.80 | 1.16 | 1.11 | 0.61 | 0.38 | 0.92 | 0.61 |
| ηinh, t = 168 hrs. | 0.83 | 0.73 | 1.17 | 1.06 | 0.54 | 0.30 | 0.85 | 0.51 |
| ηinh, t = 336 hrs. | 0.62 | 0.57 | 1.07 | 0.96 | 0.32 | 0.21 | 0.48 | 0.31 |

[a]metosylate = methyl p-toluenesulfonate
[b]ηinh = inherent viscosity measured in DMF at c = 0.5 g. polymer/100 ml. DMF at 25° C.

EXAMPLE 5

This example shows the effect of the concentration of methyl p-toluenesulfonate on the stability of PPA in dimethylformamide. Solutions were prepared by dissolving 10 g. of the PPA in 90 g. of dimethylformamide. A specific quantity of methyl p-toluenesulfonate was added to each solution and the solutions were stored at 40° C. to accelerate the rate of polymer degradation. Periodically a sample was withdrawn from each solution and mixed with water to precipitate the polymer. The inherent viscosity of each polymer was then determined. The results are tabulated below in TABLE V:

TABLE V

| No. | Metosylate, g. | Inherent Viscosity after Aging | | | |
|---|---|---|---|---|---|
| | | 0 hrs. | 521 hrs. | 857 hrs. | 193 hrs. |
| A | 0 | 0.99 | 0.70 | 0.64 | 0.57 |
| B | 0.0025 | 0.99 | 0.86 | 0.71 | 0.60 |
| C | 0.01 | 0.99 | 0.87 | 0.78 | 0.68 |
| D | 0.04 | 0.99 | 0.95 | 0.91 | 0.86 |
| E | 0.16 | 0.99 | 1.02 | 1.02 | 0.97 |
| F | 0.64 | 0.99 | 1.17 | 1.15 | 1.10 |

The above data shows that the degree of stabilization of the polymer in dimethylformamide is dependent on the concentration of methyl p-toluenesulfonate. No explanation is offered for the apparent increase of inherent viscosity of the polymer isolated from the solution which contained 0.64 g of methyl toluenesulfonate.

EXAMPLE 6

This example shows that the inherent viscosity of PPA rapidly decreases in a dimethylformamide solution which contains dimethylamine, a hydrolysis product of the solvent.

To a solution of 8 g. of PPA in 90 g. of dimethylformamide was added 0.64 g of a 22.3% aqueous solution of dimethylamine (0.14 g. of the dimethylamine and 0.50 g. water) at 27° C. After 2 minutes, part of the solution was cast into a film; after evaporation the residual film was very brittle and could not be removed from the substrate. This contrasts with the strong flexible film cast from a similar solution which did not contain any dimethylamine. Therefore, the polymer was degraded by the amine.

Polymer was precipitated from the solution which contained the amine 50 minutes after the dimethylamine was added. It had an inherent viscosity of 0.30 which is considerably lower than its original value (0.99) and of that of the polymer ($\eta$inh=0.99) insolated from a control solution which was not mixed with the amine. The polymer, however, had an infrared spectrum identical to that of the original polymer. This implies that the structure of the polymer was unchanged but that the change in the inherent viscosity was due to polymer chain scissions. The rate of degradation was fast.

EXAMPLE 7

This example demonstrates the effectiveness of several different aryl sulfonic acid esters as stabilizers for dimethylformamide solutions of PPA.

Seven solutions of PPA were prepared by dissolving 10 g. of the polymer in 90 g. of dimethylformamide which contained 0.40 g. of water.

Solution A contained no additives.

Solution B contained 0.020 g. ($1.07 \times 10^{-4}$ moles) of methyl p-toluenesulfonate.

Solution C contained 0.04 g. ($2.14 \times 10^{-4}$ mole) of methyl p-toluenesulfonate.

Solution D contained 0.0185 g. ($1.07 \times 10^{-4}$ mole) of methyl benzenesulfonate.

Solution E contained 0.037 g. ($2.14 \times 10^{-4}$ mole) of methyl benzenesulfonate.

Solution F contained 0.0396 g. ($1.07 \times 10^{-4}$ mole) of ethylene bis(p-toluenesulfonate).

Solution G contained 0.0792 g. ($2.14 \times 10^{-4}$ mole) of ethylene bis(p-toluenesulfonate).

The solutions were aged at 50° C. in closed bottles. Periodically samples were removed from each bottle and mixed with water to precipitate the polymer. The inherent viscosity of each polymer was determined in DMF (c=0.5 g./100 ml) at 25° C. and reported in TABLE VI.

TABLE VI

| Solution | Inherent Viscosity after aging at 50° C. | | | |
|---|---|---|---|---|
| | t = 0 | t = 24 hrs. | t = 168 hrs. | t = 336 hrs. |
| A | 0.92 | 0.84 | 0.65 | 0.55 |
| B | 0.94 | 0.92 | 0.84 | 0.76 |
| C | 0.94 | 0.94 | 0.89 | 0.80 |
| D | 0.96 | 0.94 | 0.87 | 0.79 |
| E | 0.97 | 0.96 | 0.91 | 0.86 |
| F | 0.95 | 0.89 | 0.77 | 0.68 |
| G | 0.95 | 0.92 | 0.86 | 0.80 |

All sulfonate esters stabilized the DMF solutions of the PPA. The duration of effectiveness of each sulfonate ester was increased by increasing the quantity present in solution (compare C, E, G with B, D and F respectively).

EXAMPLE 8

This example demonstrates the effectiveness of methyl p-toluenesulfonate as a stabilizer for powders and films cast from dimethylformamide solutions of PPA.

Three solutions were prepared by dissolving 550 g. of the PPA ($\eta$inh=1.06) in 2077 g. of dimethylformamide to give solutions containing 20.9 wt% of polymer. An inert release agent was also added to the solutions so that the residual polymer left in casting a film would contain 0.04% of it.

Solution A contained 0.55 g. of methyl p-toluenesulfonate.

Solution B contained 1.65 g. of methyl p-toluenesulfonate.

Solution C did not contain any methyl p-toluenesulfonate.

Polymer powder was precipitated in water from each of the solutions. After drying, the powders were aged 24 hours at 200° C. in air. Their inherent viscosities were determined and reported in TABLE VII and compared with that of the unaged powder ($\eta$inh=1.06)

TABLE VII

| Powder from Solution | $\eta$inh after 24 hrs. at 200° C. |
|---|---|
| A | 0.99 |
| B | 1.01 |
| C | 0.95 |

Clear films were cast from the solutions. Before final drying the films contained about 15% dimethylformamide. The inherent viscosities of the polymers in these films and after drying the films to remove essentially all of the DMF (conc. less than 0.1%), were determined and reported in TABLE VIII.

TABLE VIII

| Film from Solution | Wet film DMF conc. (%) $\eta$inh | Dry film $\eta$inh |
|---|---|---|
| A | 1.10 | 0.91 |
| B | 1.13 | 0.99 |
| C | 1.06 | 0.82 |

The data shows that the sulfonate ester stabilizes the film during the drying cycle, and that its effectiveness is concentration dependent.

EXAMPLE 9

This example demonstrates the effectiveness of methyl p-toluenesulfonate as a stabilizer for dimethylformamide solutions of a PPA at room temperature. It also demonstrates that methyl p-toluenesulfonate also protected the polymer from molecular weight degradation during the casting and drying of a cellular film made from the solution.

The solvent for each solution was dimethylformamide. Each solution contained 20 weight % of PPA which had an inherent viscosity of 1.28.

Solution A also contained methyl p-toluenesulfonate at a concentration of 0.02% based on the weight of the solution or 0.10% based on the weight of the polymer.

Solution D did not contain any additive. It is the control solution for comparative purposes.

After aging 194 and 542 days at room temperature (22°-24° C.) polymer was precipitated from a part of each solution and the inherent viscosity of each determined and reported in TABLE IX.

TABLE IX

| Solution | Inherent Viscosity | | |
|---|---|---|---|
| | t = o | t = 94 days | t = 542 days |
| A | 1.28 | 1.21 | 1.04 |
| B | 1.28 | 1.11 | 0.92 |

Cellular film was cast from each solution which had aged 194 days. Cellular film is made by casting the solution into a thin film, partially evaporating the solvent, coagulating the film in water, and drying the film in two stages. The first drying stage removed the water and some dimethylformamide. The second drying stage removed the residual dimethylformamide. The inherent viscosity of the polymer in each film was determined after each drying stage and reported in TABLE X. (Note: residual volatiles in the films after the first drying stage were determined so that the correct weights of films could be weighted to prepare solutions which contained 0.50 g. of polymer per 100 ml. of solution for the viscosity measurements at 25° C.

TABLE X

| Films cast from Solution | Inherent Viscosity* First Drying | after Second Drying |
|---|---|---|
| A | 1.28 | 1.33 |
| B | 1.18 | 1.09 |

*The inherent viscosity of the polymer used to prepare the solutions was 1.28.

The above data shows that the solutions which contained the additives were stabilized during storage and that the films cast from them were stabilized.

EXAMPLE 10

Methyl p-toluenesulfonate (0.25 g) was dissolved in 50 ml quantities of N-methylpyrrolidone and N,N-dimethylacetamide. Then 4 g of poly(parabanic acid) which had an inherent viscosity of 1.00 was dissolved in each of those solutions. Similarly, 4 g of the PPA were respectively dissolved in 50 ml portions of each of the solvents which did not contain the methyl p-toluenesulfonate. After being stored for 5 days at room temperature in closed jars, the polymer solutions were poured into water to precipitate the polymer. The solid polymer was washed with water and dried. The inherent viscosity of each polymer was then determined. The results set forth in Table XI show that methyl p-toluenesulfonate stabilizes solutions of polymers in organic amide solvents other than dimethylformamide. The inherent viscosities of the polymers which had been dissolved in the pure solvents decreased significantly during the storage time while polymer inherent viscosities of polymers dissolved in the solvents containing methyl p-toluenesulfonate did not change.

TABLE XI

| Solvent | Presence of Methyl p-toluenesulfonate | $\eta inh^1$ |
|---|---|---|
| N-methylpyrrolidone | No | 0.92 |
| " | Yes | 0.99 |
| N,N-dimethylacetamide | No | 0.96 |
| " | Yes | 1.00 |

[1]Inherent viscosity

EXAMPLE 11

Solutions of water in organic amide solvents were prepared by dissolving 5 ml of water in 95 ml portions of dimethylformamide, N,N-dimethylacetamide, and N-methylpyrrolidone. Then 0.25 g of methyl p-toluenesulfonate was dissolved in respective 50 ml portions of each of those solutions. Nothing was added to the remaining 50 ml portions of each solution. 4 g of poly(parabanic acid) was respectively dissolved in each of the six solutions. After aging 5 days in closed jars at room temperature, the polymer solutions were poured into water to precipitate the polymer which was collected, washed with water and dried. The inherent viscosity of each polymer was then determined, which were as set forth in the following Table XII. The poly(parabanic acid) had an inherent viscosity of 1.00 prior to addition to the respective solvent solutions. The data of Table XII demonstrates that the inherent viscosity of a poly(parabanic acid) dissolved in organic amide solvents containing water decreased rapidly during storage at room temperature. However, the addition of methyl p-toluenesulfonate to the water-containing solvents effectively prevented polymer degradation, as shown by essentially unchanged inherent viscosities.

TABLE XII

| Solvent (5% water) | Methyl p-toluene sulfonate | $\eta inh$ |
|---|---|---|
| Dimethylformamide | No | 0.86 |
| " | Yes | 0.95 |
| Dimethylacetamide | No | 0.78 |
| " | Yes | 0.99 |
| N-methylpyrrolidone | No | 0.78 |
| " | Yes | 0.99 |

What is claimed is:

1. The method of casting polyparabanic acid films stabilized against degradation in the presence of amines, comprising preparing a solution of polyparabanic acid in a suitable solvent, said solvent containing a stabilizing amount of an aromatic sulfonic acid ester of an aliphatic, arylaliphatic or alicyclic alcohol or polyol, casting said solution of polyparabanic on a suitable surface, evaporating said solvent to obtain a polyparabanic acid film and drying said film.

2. The method of claim 1 wherein the aromatic sulfonic acid ester is a compound having one of the following structures:

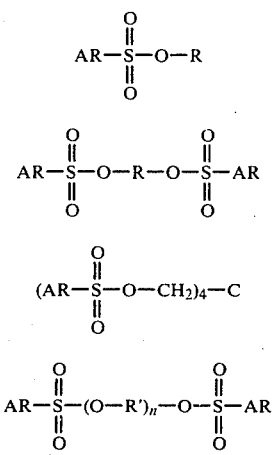

wherein AR is an unsubstituted or substituted aryl or alkylaryl group having 6 to 18 carbon atoms, wherein substituents are selected from alkoxy, halogen, alkoxy carbonyl, acyl, nitro, hydroxy and carbonyl; wherein R is an unsubstituted or substituted aliphatic aryl aliphatic or alicyclic group having from 2 to 18 carbon atoms and wherein the substituents are selected from alkoxy, halogen, alkoxy carbonyl, acyl, nitro, hydroxy and carbonyl groups; wherein R' is a divalent aliphatic group having 2 to 4 carbon atoms; and n is an integer of from 2 to 100.

3. The method of claim 1 wherein the solvent is dimethylformamide.

4. The method of claim 1 wherein the aromatic sulfonic acid ester is methyl p-toluenesulfonate.

5. The method of casting microcellular polyparabanic acid films stabilized against degradation in the presence of amines comprising preparing a solution of polyparabanic acid in a suitable solvent, said solvent containing a stabilizing amount of an aromatic sulfonic acid ester of an aliphatic, arylaliphatic or alicyclic alcohol or polyol, casting said solution of polyparabanic acid onto a suitable surface, partially evaporating the solvent, coagulating the film in water, and drying the film so as to remove the water and solvent thereby obtaining polyparabanic microcellular film.

6. The method of claim 5 wherein the aromatic sulfonic acid ester is a compound having one of the following structures:

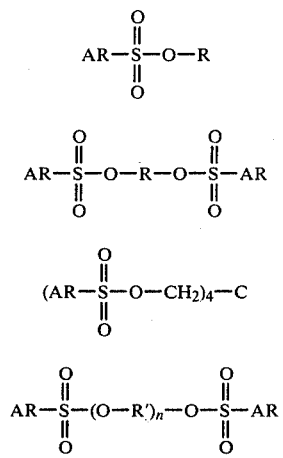

wherein AR is an unsubstituted or substituted aryl or alkylaryl group having 6 to 18 carbon atoms, wherein substituents are selected from alkoxy, halogen, alkoxy carbonyl, acyl, nitro, hydroxy and carbonyl; wherein R is an unsubstituted or substituted aliphatic aryl aliphatic or alicyclic group having from 2 to 18 carbon atoms and wherein the substituents are selected from alkoxy, halogen, alkoxy carbonyl, acyl, nitro, hydroxy and carbonyl groups; wherein R' is a divalent aliphatic group having 2 to 4 carbon atoms; and n is an integer of from 2 to 100.

7. The method of claim 5 wherein the solvent is dimethylformamide.

8. The method of claim 5 wherein the aromatic sulfonic acid ester is methyl p-toluenesulfonate.

* * * * *